United States Patent
Gazzola et al.

(10) Patent No.: US 7,633,967 B2
(45) Date of Patent: Dec. 15, 2009

(54) MULTI-FUNCTIONAL LINE CARD FOR METRO OPTICAL APPLICATIONS

(75) Inventors: Maurizio Gazzola, Milan (IT); Ronald Dale Johnson, Jr., San Ramon, CA (US); David Bianchi, Cambiago (IT); Jeffrey Douglas Maddox, McKinney, TX (US); Luca Della Chiesa, Concorezzo (IT)

(73) Assignee: Cisco Technology, Inc., San Jose, CA (US)

( * ) Notice: Subject to any disclaimer, the term of this patent is extended or adjusted under 35 U.S.C. 154(b) by 445 days.

(21) Appl. No.: 11/278,577

(22) Filed: Apr. 4, 2006

(65) Prior Publication Data
US 2007/0237164 A1  Oct. 11, 2007

(51) Int. Cl.
*H04J 3/16* (2006.01)
*H04L 12/28* (2006.01)
*G01R 31/08* (2006.01)
*H04J 14/00* (2006.01)

(52) U.S. Cl. .................. 370/466; 370/419; 370/216; 398/45

(58) Field of Classification Search ............... None
See application file for complete search history.

(56) References Cited

U.S. PATENT DOCUMENTS

| | | | |
|---|---|---|---|
| 6,425,009 B1 | 7/2002 | Parrish et al. | |
| 6,956,847 B2* | 10/2005 | Heston et al. | 370/419 |
| 7,164,860 B1* | 1/2007 | Narvaez et al. | 398/58 |
| 7,469,103 B2* | 12/2008 | Binetti et al. | 398/83 |
| 2004/0028408 A1* | 2/2004 | Cox et al. | 398/66 |
| 2004/0086003 A1 | 5/2004 | Natarajan et al. | |
| 2006/0002415 A1 | 1/2006 | Heston et al. | |
| 2006/0002419 A1* | 1/2006 | Cox et al. | 370/445 |

\* cited by examiner

*Primary Examiner*—Pankaj Kumar
*Assistant Examiner*—Hicham B Foud

(57) ABSTRACT

Methods and apparatus for allowing a dense wave division multiplexing (DWDM) line card w to function as an add/drop multiplexer (ADM), a transponder, and a muxponder are disclosed. According to one aspect of the present invention, a line card suitable for use in a network to aggregate signals of different line rates for transport includes a first arrangement having ADM functionality, a second arrangement having transponder functionality, and a third arrangement having muxponder functionality. The line card also includes hardware that facilitates communication between the arrangements, as well as a plurality of ports arranged to receive a signal and to provide the signal to the hardware.

10 Claims, 5 Drawing Sheets

MULTI-FUNCTIONAL LINE CARD FOR METRO OPTICAL APPLICATIONS

BACKGROUND OF THE INVENTION

1. Field of Invention

The present invention relates generally to networks. More particularly, the present invention relates to a multi-functional dense wave division multiplexing line card that has add/drop multiplexer, transponder, and muxponder capabilities, and may be readily reconfigured to support additional traffic demands.

2. Description of the Related Art

The use of the Gigabit Ethernet (GbE) communications protocol is becoming more widely used in networking applications. As a result, synchronous optical network (SONET) or synchronous digital hierarchy (SDH) networks that were not designed to transport GbE signals must be augmented in order for GbE signals to be transported.

Many optical networks are dense wave division multiplex (DWDM) based. DWDM-based networks may transmit data of substantially any protocol and any bit-rate. Hence, DWDM-based networks may transmit SONET, SDH, and Ethernet signals. FIG. 1 is a block diagram representation of a network. A network 100 may be a wide area network that includes a local area network 102 with nodes 110b-d and links 114a-d which allow nodes 110b-d to communicate. Nodes 110b-d may be network elements such as switches, while links 114a-d may be wireless communications links or wired communications links such as fiber-optic cable. A node 110a may be a client which requests access to nodes 110b-d through a trunk 118. Trunk 118 may be used to substantially interconnect nodes 110a-d to form network 110 from local area network 102 and node 110a. In other words, trunk 118 may be considered to be a communications channel between local area network 102 and client 110a.

Local area network 102 may be a SONET/SDH network. As GbE is becoming more prevalent, the ability to carry GbE signals over local area network 102 that supports SONET/SDH is desirable. Hence, trunk 118 and node 110a may each include line cards which effectively allow GbE signals to be transported through network 100.

With reference to FIG. 2, line cards which are included in a client and a trunk will be described. A client 210 and a trunk 218 each include an add/drop multiplexer (ADM) line card 222a, 222b, a transponder line card 226a, 226b, and a muxponder line card 230a, 230b. ADM line cards 222a, 222b are arranged to provide an interface between higher speed and lower speed signals. By way of example, a SONET ADM may extract lower rate signals from a higher rate multiplexed signal or insert lower rate signals into a higher rate multiplexed signal. A signal may be added or dropped substantially without disrupting the transmission of other signals included in a multiplexed signal. Transponder line cards 226a, 226b function as transmitters and responders, and are arranged to pick up and to respond to incoming signals. Transponder line cards 226a, 226b are typically modules that receive an incoming signal and convert the incoming signal to a wavelength to be optically multiplexed with other wavelengths. Muxponder line cards 230a, 230b have the combined functionality of multiplexers and transponders, and are arranged to enable multiple channels to share a single wavelength.

Line cards associated with client 210 and line cards associated with trunk 218 are often different. For example, ADM line card 222a that is suitable for use as a part of client 210 may be different from ADM line card 222b that is suitable for use as part of trunk 218. For client 210, ADM line card 222a may be an ADM-on-a-blade line card.

With reference to FIG. 3, the steps associated with configuring a trunk or a client to support particular traffic types will be described. A process 300 of configuring a trunk or a client begins at step 304 in which a current traffic type that is to be transported across a SONET/SDH network is identified. Once the current traffic type is identified, transponder line cards, muxponder line cards, and ADM line cards that support the current traffic type may be purchased or otherwise obtained in step 308. Line cards are generally specific to line rates and protection schemes.

In step 312, the trunk or the client are configured to support the current traffic type. Configuring the trunk or the client often includes updating software associated with the trunk or the client. Then, the current traffic type is transported through the trunk or the client in step 316. A determination is made in step 320 as to whether a different, or unsupported traffic type, is requested. That is, it is determined if a different traffic demand has been requested. A different traffic demand may correspond to a different line rate, or a different protection scheme. If it is determined that a different traffic demand has not been requested, process flow returns to step 316 in which the current traffic type continues to be transported.

Alternatively, when the determination in step 320 is that a different traffic demand has been requested, then at least some of the line cards associated with the trunk or the client are replaced in step 324. In other words, new transponder line cards, muxponder line cards, and ADM line cards which support the different traffic demand may be purchased or otherwise obtained. Once obtained, the new line cards are installed in the system, i.e., the trunk or the client, and the system is configured to support the different traffic demand in step 328. After the system is configured to support the different traffic type, the different traffic type is transported as a current traffic type in step 322. From step 332, process flow returns to step 320 in which it is determined whether a different traffic type is requested.

Although replacing transponder line cards, muxponder line cards, and ADM line cards as necessary is effective in enabling new traffic demands to be supported, replacing line cards is inefficient. Having to replace one or more line cards, and to reconfigure an overall system once one or more line cards have been replaced, may be both time-consuming and expensive. Further, the use and the maintenance of multiple line cards is also often expensive.

While a network administrator may anticipate future traffic demands and configure a system accordingly, i.e., a network administrator may set up a system to support more than a set of initially demanded traffic types, future traffic demands are often difficult to predict. As a result, even line cards which account for future traffic demands are likely to have to be replaced when unanticipated traffic demands are requested.

Therefore, what is needed is a system in which different traffic demands may be supported substantially without requiring that one or more line cards be replaced. That is, what is desired is a method and an apparatus that has the flexibility to allow new traffic demands to be supported without the need for replacing line cards.

BRIEF DESCRIPTION OF THE DRAWINGS

The invention may best be understood by reference to the following description taken in conjunction with the accompanying drawings in which.

DETAILED DESCRIPTION

The ability to efficiently upgrade a system to support a new traffic type or a new traffic demand that is to be transmitted through a synchronous optical network (SONET) network, a synchronous digital hierarchy (SDH) network, or a dense wave division multiplexing (DWDM) network is crucial. When one or more line cards needs to be replaced when a new traffic type is to be transported, the cost and the efficiency associated with supporting a new traffic type may be prohibitive.

In one embodiment, a single optical module or line card acts as a transponder, a muxponder, and an add/drop multiplexer (ADM). Such a line card may be configured to be used as a part of both a client and a trunk. By allowing pluggable components such as small form factor pluggable (SFP) components to provide transponder, muxponder, and ADM functions in a module, upgrades may be readily made by replacing or adding appropriate SFPs to the module. Hence, by upgrading the module, different or additional traffic types may be supported without having to replace one or more line cards. As such, a system may be updated to support a new traffic demand relatively inexpensively and efficiently, and substantially without having to replace line cards.

Figure 1:
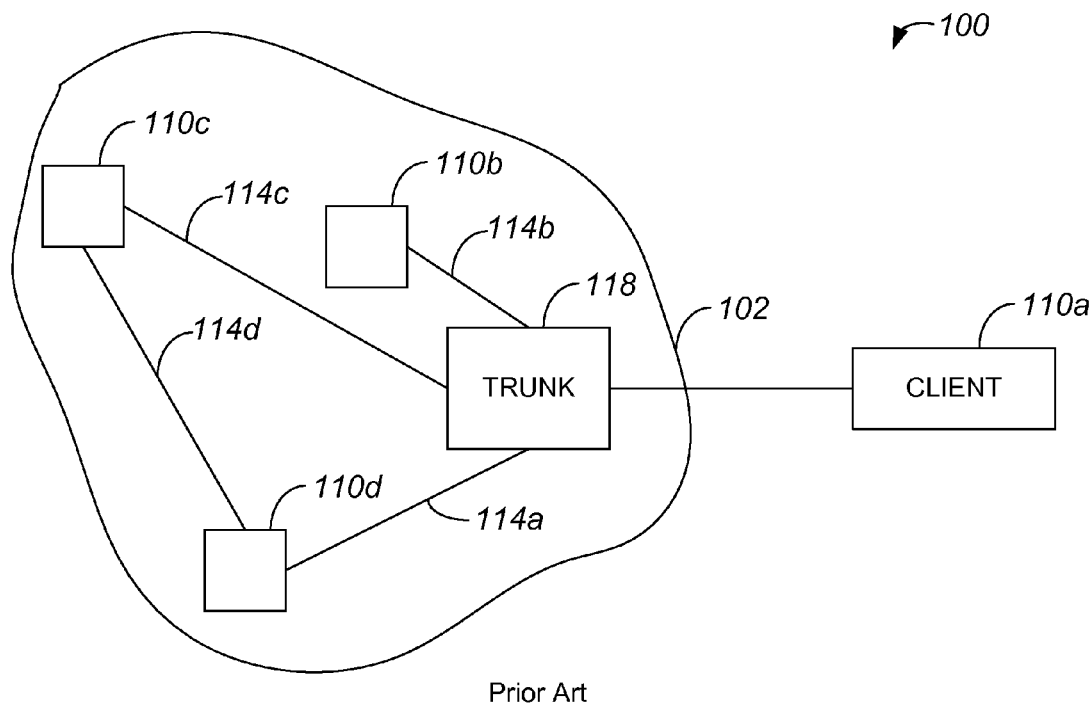
FIG. 1 is a block diagram representation of a network.
Figure 2:
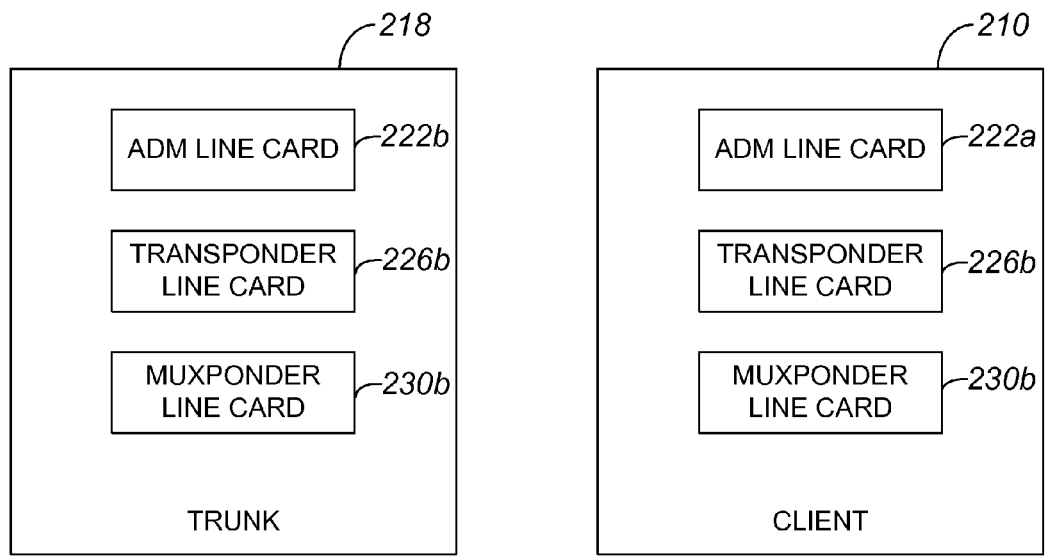
FIG. 2 is a block diagram representation of line cards used with a trunk and line cards used with a client within a network that supports dense wave division multiplexing (DWDM) and synchronous optical network (SONET) or synchronous digital hierarchy (SDH) transmissions.
Figure 3:
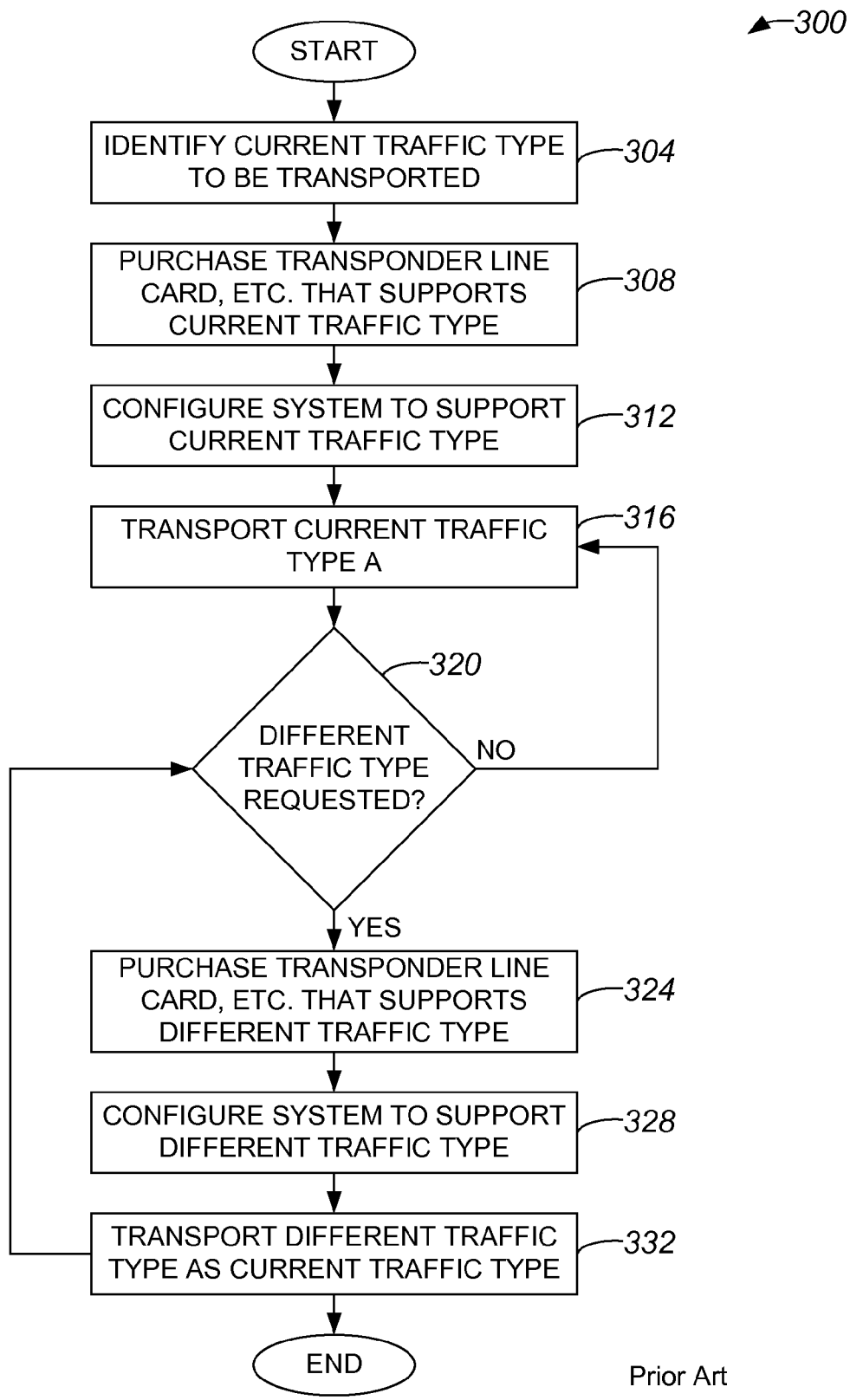
FIG. 3 is a process flow diagram which illustrates steps associated with a method of upgrading a system to support a different traffic type.
Figure 4A:
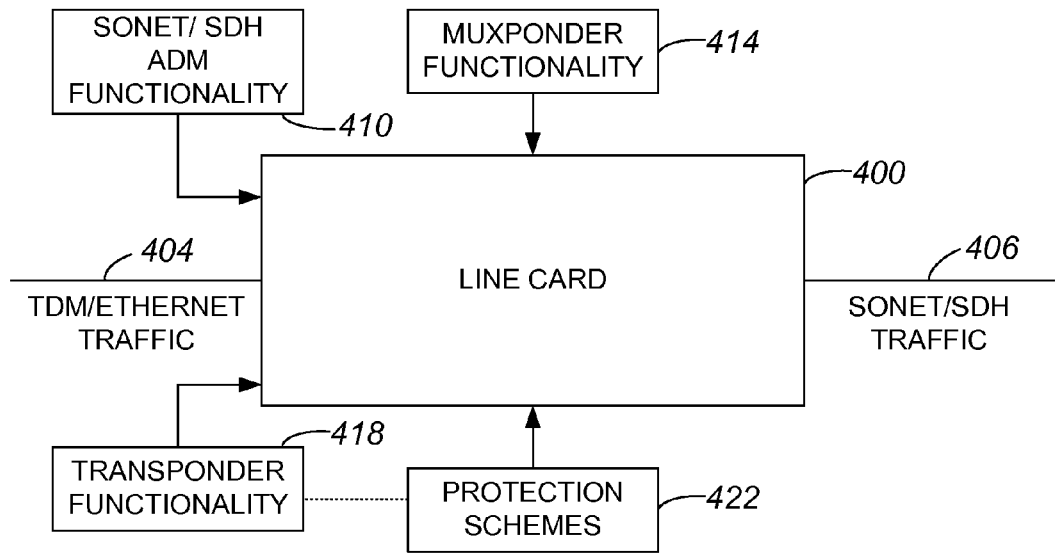
FIG. 4A is a block diagram representation of the functionality associated with a multi-functional line card in accordance with an embodiment of the present invention.

FIG. 4A is a block diagram representation of the functionality associated with a multi-functional line card in accordance with an embodiment of the present invention. A multi-functional line card 400 is arranged to accept traffic 404 that is to be processed into traffic 406 that may be transported through a SONET/SDH network or a DWDM network. Multi-functional line card 400 is further arranged to accept traffic 406 from a SONET/SDH network or a DWDM network and to process traffic 406 to form traffic 404 which, in one embodiment, is either time-division multiplexed (TDM) or Ethernet traffic.

Multi-functional line card 400 is generally a single board with components which provide different functionality, and is arranged to aggregate multiple types of traffic. In one embodiment, multi-functional line card 400 may be arranged to aggregate OC3, OC12, OC48, and gigabit Ethernet (GbE) traffic. While the functionality is generally provided by SFP components, it should be understood that the functionality may also be provided by other components, e.g., daughter boards. In general, multi-functional line card includes ADM functionality 410, muxponder functionality 414, and transponder functionality 418. ADM functionality 410 may be provided as an ADM-on-a-blade.

Protection schemes 422 may also be implemented by multi-functional line card 400. Protections schemes 422 may be widely varied and may include, but are not limited to, 1+1 automatic protection switching (APS) schemes, Y-cable optical channel protection schemes, unidirectional path switched ring (UPSR) schemes, splitter optical channel protection schemes, and bidirectional line switched ring (BLSR) schemes.

Figure 4B:
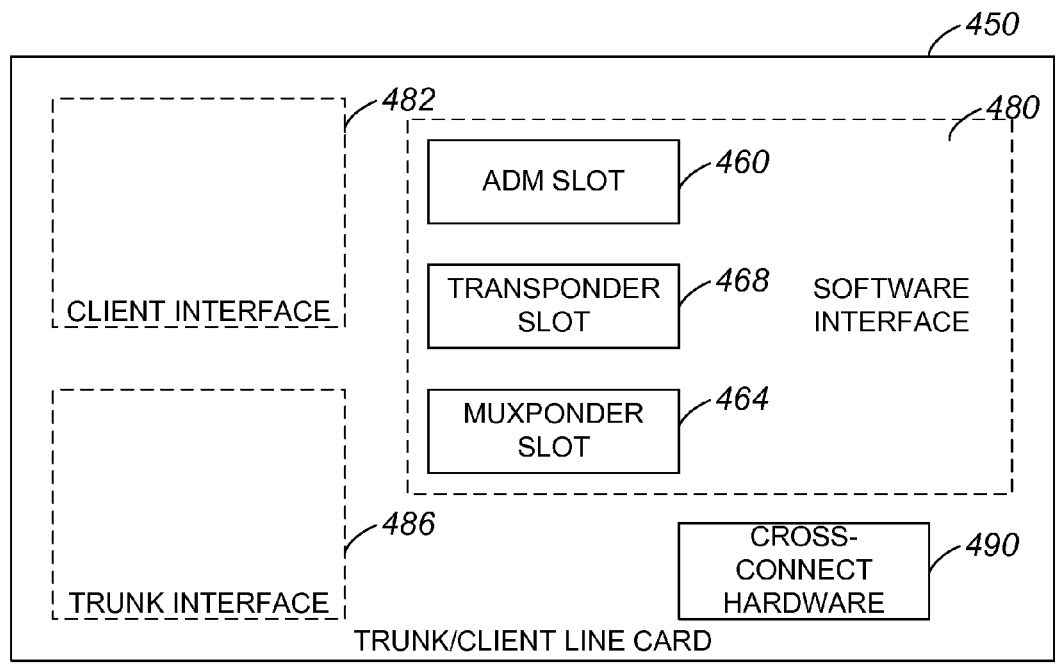
FIG. 4B is a block diagram representation of a multi-functional line card in accordance with an embodiment of the present invention.

As mentioned above, functionality on multi-functional line card 400 is typically provided by pluggable components such as SFP or XFP components. In order to accommodate pluggable components, multi-functional line card 400 may include hardware and slots which facilitates the insertion and removal of pluggable components. With reference to FIG. 4B, the general layout of a multi-functional line card will be described in accordance with an embodiment of the present invention. A multi-functional line card 450 is arranged to be used for many purposes, e.g., as both a trunk and a client. Interfaces associated with multi-functional line card 450 include an interface 460 for ADM capabilities, an interface 468 for transponder capabilities, and an interface 464 for muxponder capabilities. By reconfiguring software associated with a software interface 480, multi-functional line card 450 may function as an ADM, a transponder, or a muxponder based on traffic flow and aggregation capability. It should be appreciated that hardware associated with an ADM, a transponder, and a muxponder may be upgraded or replaced.

A client interface 482, which may include a plurality of input and output ports, of multi-functional line card 450 allows inputs to and outputs from a client to be made when multi-functional line card 450 is part of the client. In one embodiment, client interface 482 is a pluggable interface that allows multi-functional line card 450 to function as a client. The pluggable interface may generally be arranged to accommodate any number of SFPs. Client interface 482 may include hardware that allows various signals to be received and transmitted. The received and transmitted signals may include, but are not limited to, Ethernet, SONET, and SDH signals. It should be appreciated that the actual signals may have any suitable line rates. By way of example, an Ethernet signal may be a GbE signal, while a SONET signal may have an OC3, an OC12, and OC48, or an OC192 line rate. A trunk interface 486, which may be used when multi-functional line card 450 is used as a part of a trunk, includes hardware and a plurality of ports which may be arranged to allow a variety of signals to be received and transmitted. Trunk interface 486 may also be arranged to provide framing capabilities. Like client interface 482, trunk interface 486 may be a pluggable interface.

The number of ports associated with client interface 482 and trunk interface 486 may vary. In one embodiment, client interface 482 may include approximately sixteen ports with a total capacity of approximately ten Gigabits. The approximately sixteen ports may include approximately four ports arranged to accept OC48, OC12, and OC3 transmissions or approximately sixteen ports arranged to receive OC12 or OC3 transmissions. Alternatively, when GbE transmissions are supported, the approximately sixteen ports may include approximately eight to ten ports arranged to accept GbE transmissions.

Cross-connect hardware 490 may also be included in multi-functional line card 450 to provide a switching fabric. In general, slots 460, 464, 468 are coupled to cross-connect hardware 490 such that functionality associated with slots 460, 464, 468 may be interfaced with each other and with cross-connect hardware 490. A software interface 480 is arranged to allow multi-functional line card 450 to be configured to add additional traffic types or services associated with SFPs in slots 460, 464, 468. Alternatively, functionality associated with slots 460, 464, 468 may be provided substantially in software. In addition, software interface 480 may be arranged to manage a DWDM layer as well as the functionality associated with the SFPs.

Figure 5A:
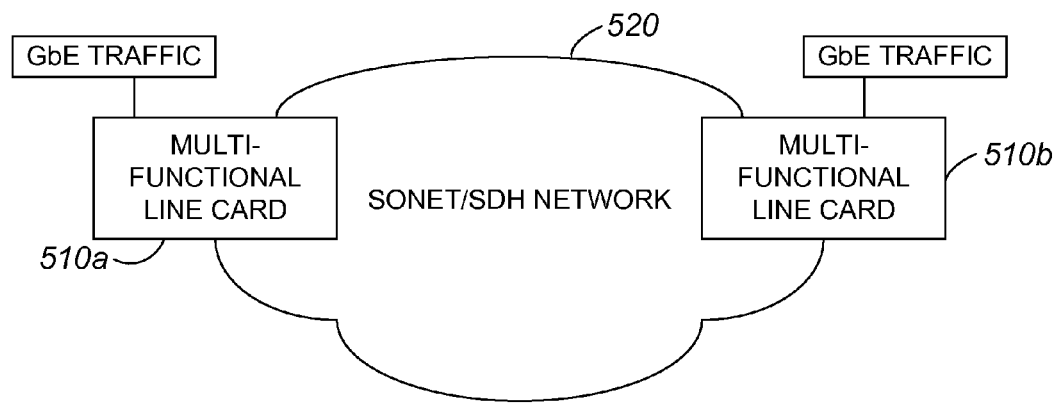
FIG. 5A is a block diagram representation of multi-functional line cards interfaced with a SONET/SDH network in accordance with an embodiment of the present invention.

The use of a multi-functional line card such as line card 400 of FIG. 4A or line card 450 of FIG. 4B replaces the need to use multiple line cards to allow TDM and Ethernet traffic to be transported through a SONET/SDH network. FIG. 5A is a block diagram representation of multi-functional line cards interfaced with a SONET/SDH network in accordance with an embodiment of the present invention. A multi-functional line card 510a which acts as a client and a multi-functional line card 510b which acts as a trunk may be in communication with a SONET/SDH network 520. Line cards 510a, 510b may be arranged to aggregate a plurality of different types of traffic into network 520, as line cards 510a, 510b include ADMs, transponders, and muxponders. In the described embodiment, line cards 510a, 510b are arranged to support at least GbE traffic, although line cards 510a, 510b may generally support any type of traffic.

Figure 5B:
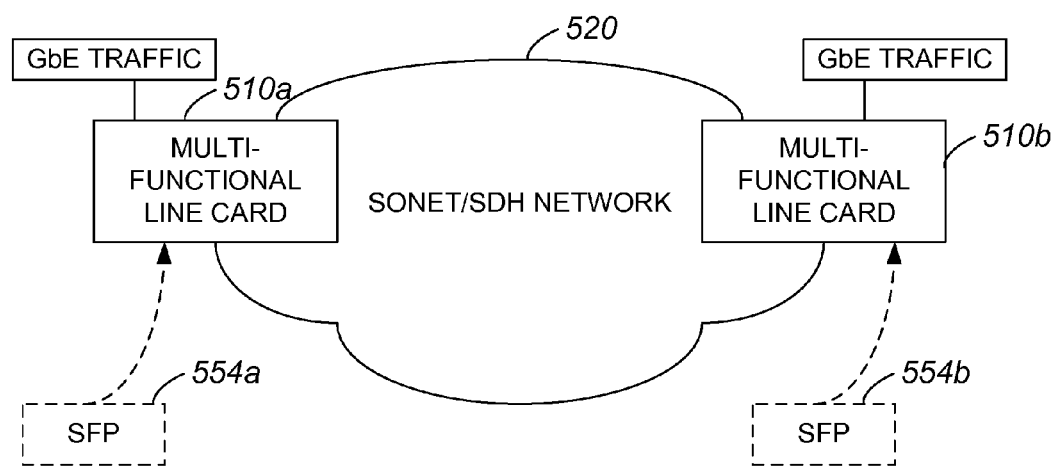
FIG. 5B is a block diagram representation of multi-functional line cards, i.e., multi-functional line cards 510a-b of FIG. 5A, in which small form factor pluggable components may be replaced in accordance with an embodiment of the present invention.

If a traffic type that is not supported by line cards 510a, 510b is demanded, line cards 510a, 510b may be upgraded or augmented to support the traffic type. As shown in FIG. 5B, by adding new SFPs 554a, 554b to line cards 510a, 510b, respectively, line cards 510a, 510b may be configured to support the previously unsupported traffic type. By way of example, if SONET traffic with a 1+1 APS protection scheme is to be supported, then SFPs 554a, 554b with transponder and muxponder functionality that supports the desired protected SONET traffic may be added to line cards 510a, 510b. In general, adding SFPs 554a, 554b may involve either replacing previously installed SFPs (not shown) or allowing SFPs 554a, 554b to be used in addition to the previously installed SFPs.

Though line card 510a and line card 510b may be the same line card, i.e., though line card 510a which is used as a client line card and line card 510b which is used as a trunk line card may have the same underlying mother board, SFPs used on line card 510a and line card 510b may be different. That is, ADM, transponder, and muxponder SFPs on line card 510a may differ from ADM, transponder, and muxponder SFPs on line card 510b.

Figure 6:
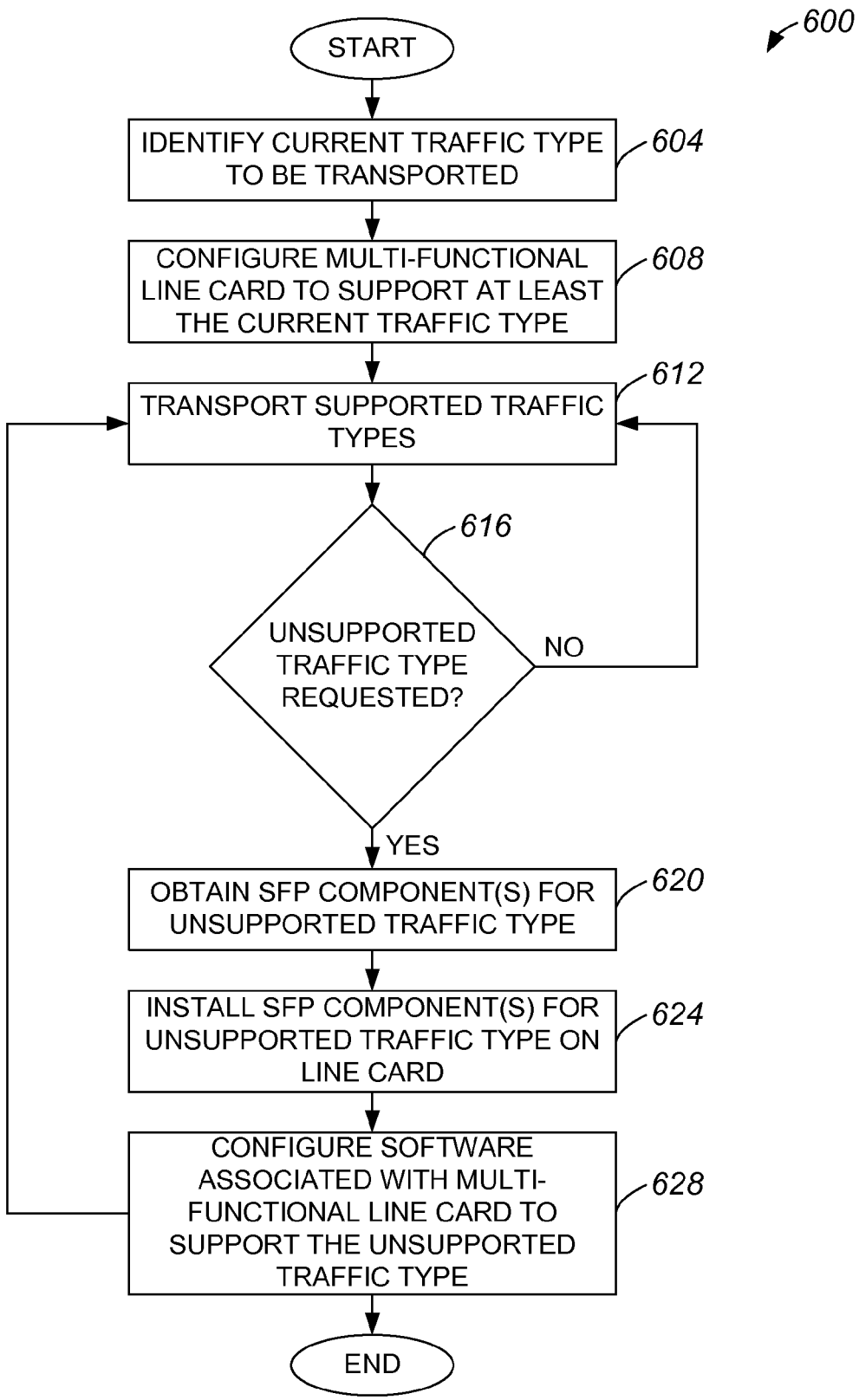
FIG. 6 is a process flow diagram which illustrates steps associated with a method of upgrading a multi-functional line card to support a new traffic type in accordance with an embodiment of the present invention.

FIG. 6 is a process flow diagram which illustrates steps associated with a method of upgrading a multi-functional line card to support a new traffic type in accordance with an embodiment of the present invention. A process 600 of upgrading a multi-functional line card to support a new traffic demand begins at step 604 in which at least one current traffic type to be transported is identified. Traffic types, or traffic demands, may vary widely and may include, but are not limited to, GbE traffic, SONET traffic, and SDH traffic. The traffic types may also be unprotected or protected, e.g., protected using 1+1 automatic protection switching (APS) or a unidirectional path switched ring (UPSR).

After at least one current traffic type to be transported is identified, then a multi-functional line card is configured to support the at least one current traffic type in step 608. Configuring the multi-functional line card may include selecting and installing SFPs on the line card and configuring software associated with the line card to support the at least one current traffic type. The multi-functional line card may be configured, for example, as an ADM-on-a-blade, as a transponder, or as a muxponder using software. SFPs provide interface flexibility in hardware components that may be needed to support a particular software configuration. For example, if the multi-functional line card is to function as a transponder for one client using one trunk, approximately two SFPS that support the same rate may be plugged in such that one SFP is plugged into a client interface and another SFP is plugged into a trunk interface. Alternatively, if the multi-functional line card is to function as a muxponder for two or more clients multiplexed using one trunk, two or more lower bit rate SFPs may be plugged into a client interface while a higher rate SFP may be plugged into a trunk interface. In one embodiment, if the multi-functional line card is to function as an ADM with at least two low bit rate clients that are internally cross-connected to support SONET functionality over approximately two trunks with UPSR protection, multiple SFPS of a lower bit rate may be plugged into a client interface while approximately two SFPS of a higher bit rate may be plugged into a trunk interface.

Once the multi-functional line card is configured in step 608, the supported traffic types are transported in step 612 using the multi-functional line card. A determination is made in step 616 whether an unsupported traffic type is requested. In other words, it is determined in step 616 if a different traffic demand is requested.

If the determination in step 616 is that no unsupported traffic type is requested, process flow returns to step 612 in which supported traffic types are transported. Alternatively, if the determination in step 616 is that an unsupported traffic type is requested, then in step 620, at least one SFP component that may be used to provide support for the unsupported traffic type is obtained in step 620. SFP components may include, but are not limited to, components with transponder functionality, components with muxponder functionality, and components with ADM functionality.

Upon obtaining any new SFP components to be used to support the unsupported traffic type, the new SFP components may be installed onto the multi-functional line card in step 624. Installing new SFP components may include removing previously installed SFP components and effectively replacing those SFP components with the new SFP components. However, it should be appreciated that the SFP components that support the unsupported traffic type may instead be added to the multi-functional line card to operate in conjunction with previously installed SFP components.

Once any new SFP components are installed or otherwise coupled to the multi-functional line card, process flow proceeds to step 628 in which software associated with the multi-functional line card is configured to support the unsupported traffic type. After the software is configured to support the unsupported traffic type, then that traffic type becomes a supported traffic type, and process flow returns to step 612 in which the supported traffic types are transported.

Although only a few embodiments of the present invention have been described, it should be understood that the present invention may be embodied in many other specific forms without departing from the spirit or the scope of the present invention. By way of example, although the ADM functionality, the transponder functionality, and the muxponder functionality on multi-functional line cards has been described as being provided by SFPs or other pluggable components, such functionality may be provided by substantially any suitable component.

The types of traffic, the line rates associated with traffic, and protection schemes that are supported by a multi-functional line card may vary widely. Additionally, the networks with which multi-functional line cards are interfaced may also vary widely. While a SONET/SDH network has been described, a network to which multi-functional line cards are interfaced may instead be a DWDM ring.

A module or a multi-functional line card is not limited to including transponders, muxponders, and ADMs. A multi-functional line card may include components that provide additional functionality. Alternatively, a multi-functional line card may include any subset of transponders, muxponders, or ADMs. By way of example, a multi-functional line card may include a transponder and a muxponder but not ADM, or an ADM and a transponder but not a muxponder.

A multi-functional line card may have many features in addition to those described above. For instance, SONET management features such as section and line fault, configuration, and performance management may be incorporated into a line card. Similarly, GbE management features such as fault, configuration and performance management features may also be included in a line card.

The steps associated with the methods of the present invention may vary widely. Steps may be added, removed, altered, combined, and reordered without departing from the spirit of the scope of the present invention. Therefore, the present examples are to be considered as illustrative and not restrictive, and the invention is not to be limited to the details given herein, but may be modified within the scope of the appended claims.

The invention claimed is:

1. A line card comprising:
   an add/drop multiplexer (ADM) configured to add and/or drop optical wavelengths for an optical network;
   a transponder configured to upconvert signals incoming from a network to optical wavelengths for transmission over the optical network;
   a muxponder configured to multiplex incoming signals from the transponder into optical wavelengths for transmission over the optical network;
   a software interface coupled to the ADM, the transponder, and the muxponder that is configured to add or delete additional traffic types or services associated with ADM, the transponder, and the muxponder;
   cross-connect hardware coupled to the ADM, the transponder, and the muxponder that is configured to provide a switching fabric for ADM, transponder, and muxponder communication;
   a pluggable interface that is configured to accept a pluggable component configured to be removably coupled to the line card and coupled to the software interface, the pluggable component being configured to provide a client interface or a trunk interface and is further configured to enable client or trunk communication over the optical network; and
   a plurality of ports coupled to the pluggable component each port being configured to receive a client or trunk signal and to provide the client or trunk signal to the pluggable component.

2. The line card of claim 1, wherein the pluggable component is a small form factor pluggable (SFP or XFP) component.

3. The line card of claim 1, wherein the pluggable component is configured to provide the client or trunk signal as a synchronous optical network (SONET) signal, a synchronous digital hierarchy (SDH) signal, or a gigabit Ethernet (GbE) signal.

4. The line card of claim 1, wherein the transponder, muxponder, and ADM are configured to operate with the optical network, wherein the optical network is a dense wave division multiplexing (DWDM) network, a synchronous optical network (SONET) network, or a synchronous digital hierarchy (SDH) network.

5. The line card of claim 1, wherein the plurality of ports includes at least one port associated with a trunk or at least one port associated with a client.

6. The line card claim 1, wherein the ADM, the transponder, and the muxponder are pluggable components, and further comprising:
   a first pluggable receptacle, configured to receive the ADM;
   a second pluggable receptacle, configured to receive the transponder; and
   a third pluggable receptacle, configured to receive the muxponder.

7. The line card of claim 1, wherein the transponder is further configured to downconvert optical wavelengths to outgoing signals for transmission over the network.

8. The line card of claim 1, wherein the muxponder is further configured to demultiplex optical wavelengths into outgoing signals for transmission over the network.

9. The line card of claim 4, wherein the transponder is further configured to implement an optical protection scheme.

10. The line card of claim 6, wherein the ADM, the transponder, and the muxponder are small form factor pluggable (SFP or XFP) components.

* * * * *

UNITED STATES PATENT AND TRADEMARK OFFICE
CERTIFICATE OF CORRECTION

| | | |
|---|---|---|
| PATENT NO. | : 7,633,967 B2 | Page 1 of 1 |
| APPLICATION NO. | : 11/278577 | |
| DATED | : December 15, 2009 | |
| INVENTOR(S) | : Gazzola et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 552 days.

Signed and Sealed this

Twenty-first Day of December, 2010

David J. Kappos
*Director of the United States Patent and Trademark Office*